United States Patent
Doshi et al.

(10) Patent No.: US 7,688,795 B2
(45) Date of Patent: Mar. 30, 2010

(54) COORDINATED REBOOT MECHANISM REDUCING SERVICE DISRUPTION IN NETWORK ENVIRONMENTS

(75) Inventors: Bhautik Doshi, Fremont, CA (US); Pramod S. Badjate, San Jose, CA (US); Allan Thomson, Pleasanton, CA (US); Patrice Calhoun, Pleasanton, CA (US)

(73) Assignee: Cisco Technology, Inc., San Jsoe, CA (US)

( * ) Notice: Subject to any disclaimer, the term of this patent is extended or adjusted under 35 U.S.C. 154(b) by 628 days.

(21) Appl. No.: 11/556,939

(22) Filed: Nov. 6, 2006

(65) Prior Publication Data
US 2008/0126498 A1    May 29, 2008

(51) Int. Cl.
*H04W 4/00* (2006.01)
*H04W 36/00* (2006.01)
*H04M 3/00* (2006.01)
*H04B 7/00* (2006.01)
*G06F 15/16* (2006.01)

(52) U.S. Cl. .................. 370/338; 370/328; 370/331; 455/420; 455/439; 455/41.2; 709/208; 709/209

(58) Field of Classification Search ................ 455/338, 455/436, 439; 370/218, 219, 320, 321, 331, 370/338; 709/208
See application file for complete search history.

(56) References Cited

U.S. PATENT DOCUMENTS

| | | | |
|---|---|---|---|
| 6,012,100 A | 1/2000 | Frailong et al. | |
| 6,047,322 A | 4/2000 | Vaid et al. | |
| 6,167,567 A | 12/2000 | Chiles et al. | |
| 6,341,309 B1 | 1/2002 | Vaid et al. | |
| 6,493,871 B1 | 12/2002 | McGuire et al. | |
| 6,795,415 B1 | 9/2004 | Suonvieri | 370/333 |
| 6,976,163 B1 | 12/2005 | Hind et al. | |
| 6,990,591 B1 | 1/2006 | Pearson | |
| 2002/0100036 A1 | 7/2002 | Moshir et al. | |
| 2002/0115442 A1 | 8/2002 | Dorenbosch | 455/446 |
| 2003/0212821 A1 | 11/2003 | Gillies | 709/238 |
| 2004/0090943 A1 | 5/2004 | Da Costa | 370/338 |
| 2004/0255000 A1* | 12/2004 | Simionescu et al. | 709/208 |
| 2005/0250528 A1 | 11/2005 | Song | 455/522 |
| 2006/0109815 A1 | 5/2006 | Ozer | 370/329 |

(Continued)

OTHER PUBLICATIONS

Castagnoli, Neal, "How AWPP will make mesh networks eaSler to deploy," Part 1-2, in Wireless Net Design Line, Dec. 5, 2005, CMP Media LLC, 600 Community Drive, Manhasset, NY 11030, downloadable (Sep. 28, 2006) as ~www.wirelessnetdesiqnline.com/howto/174900638at ~www.wirelessnetdesignline.com, Sep. 2006 (downloadable).

(Continued)

*Primary Examiner*—Nick Corsaro
*Assistant Examiner*—Un C Cho
(74) *Attorney, Agent, or Firm*—Baker Botts L.L.P.

(57) ABSTRACT

In one embodiment, a method includes identifying a plurality of network elements for reinitiation, wherein the network elements are operative to manage at least one child element; selecting a first network element from the plurality of network elements, transmitting a disable message to the first network element; determining whether the at least one child element has migrated to one or more alternate network elements; and conditionally transmitting a reinitiation message to the first network element.

21 Claims, 7 Drawing Sheets

U.S. PATENT DOCUMENTS

2008/0084855 A1* 4/2008 Rahman ............... 370/342

OTHER PUBLICATIONS

Calhoun et al., CAPWAP Protocol Specification draft-ietf-capwap-protocol- specification-01, www.capwap.org. Version 01, downloaded (Sep. 28, 2006) at capwap.org/draft-ictf-capwap-protocol-specification-01.txt, May 26, 2006.

IEEE Std. 802.11h-2003, also ISO/IEC 8802-11:2005/Amd 5:2006 (Amendment to AL ISO/IEC 8802-11: 2005), available from IEEE, New York, NY. Also at ~www.IEEE.orq, 2003.

PCT/US2007/078315, PCT Preliminary Report on Patentability for PCT Application No. mailed on Mar. 17, 2008.

PCT/US2007/078315, Search Report, Mar. 17, 2008.

* cited by examiner

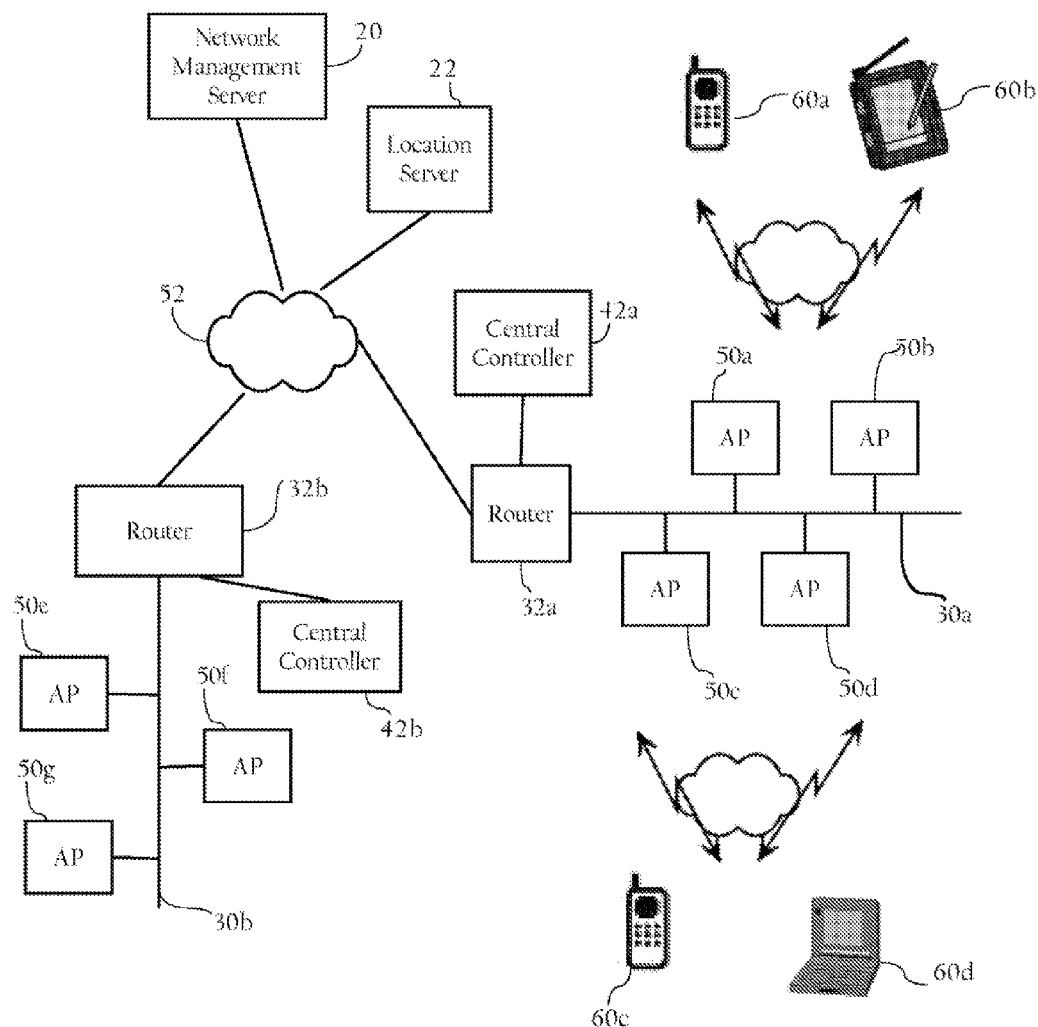
Fig._1A

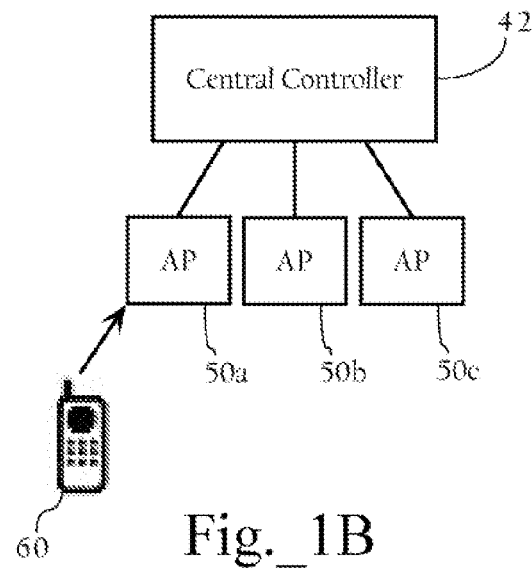
Fig._1B
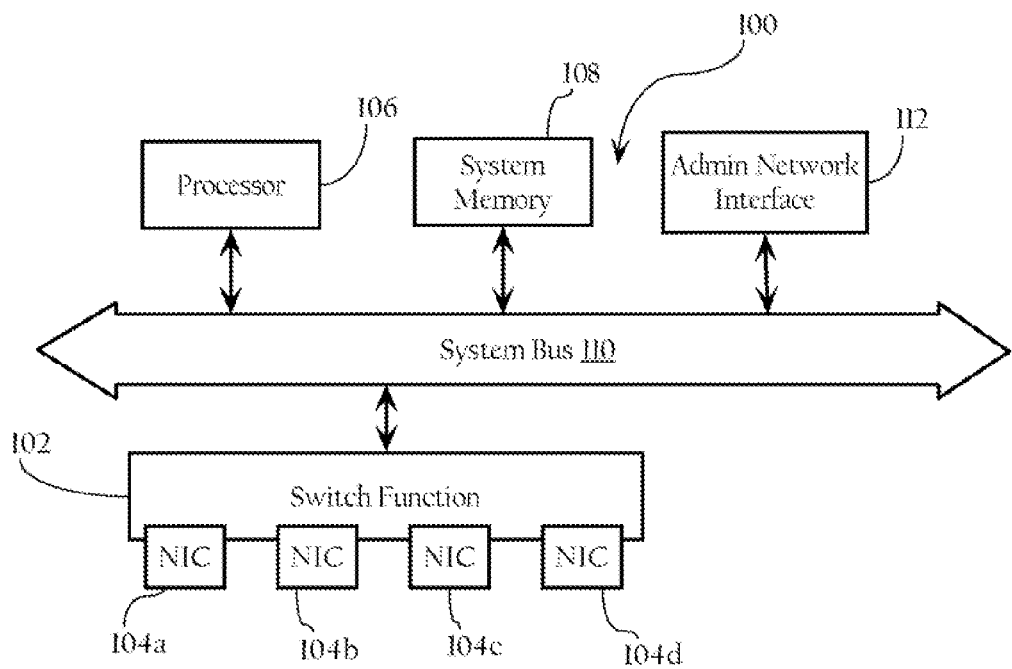
Fig._1C

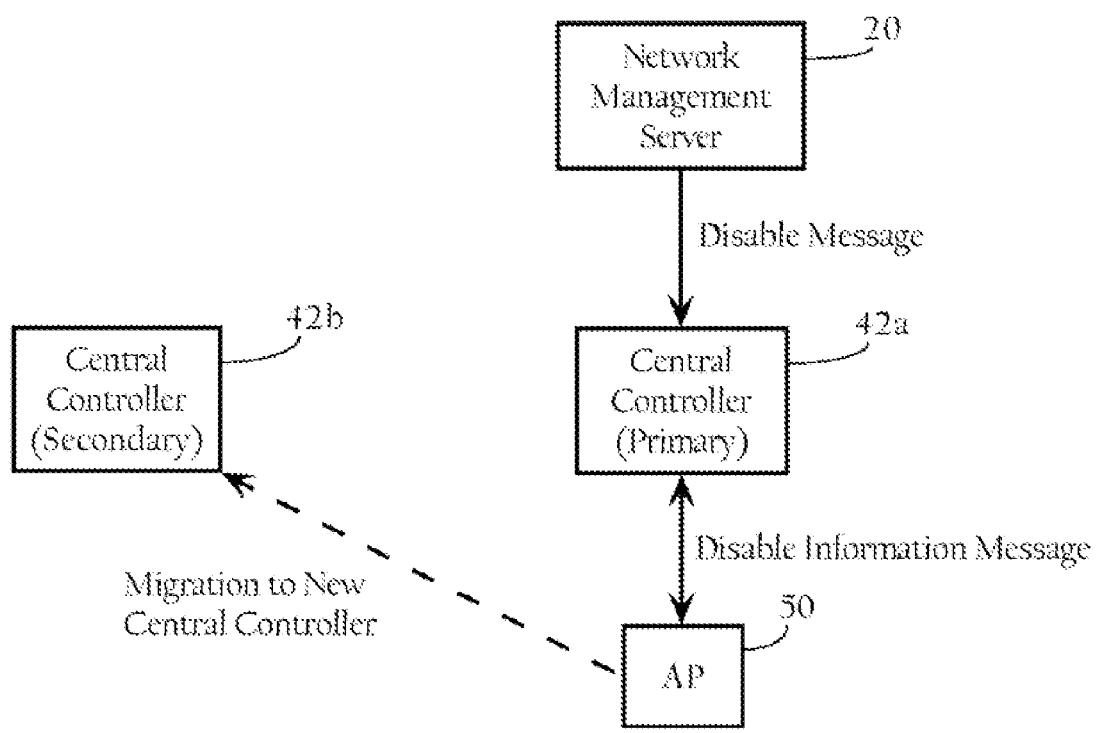
Fig._4

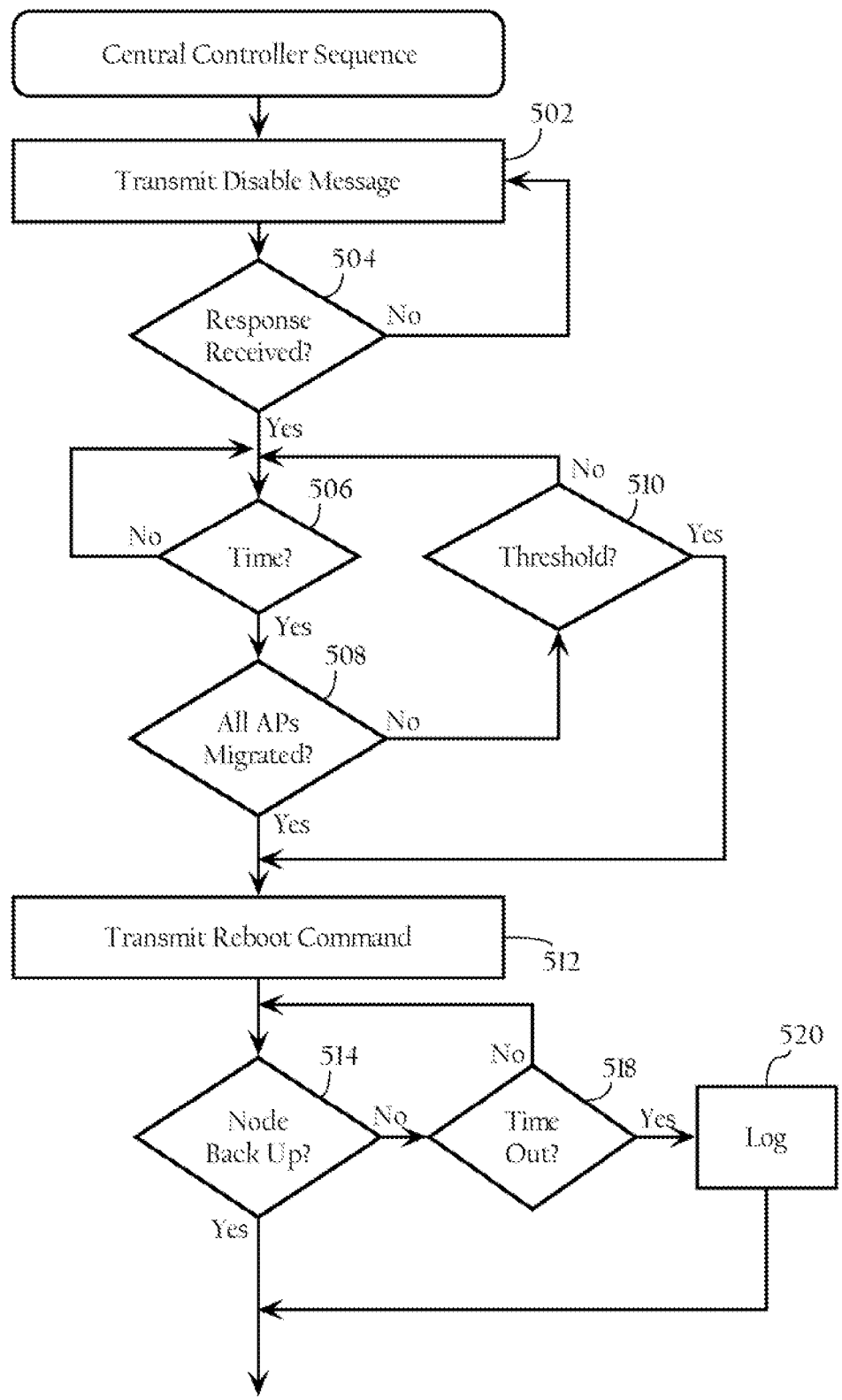
Fig._5

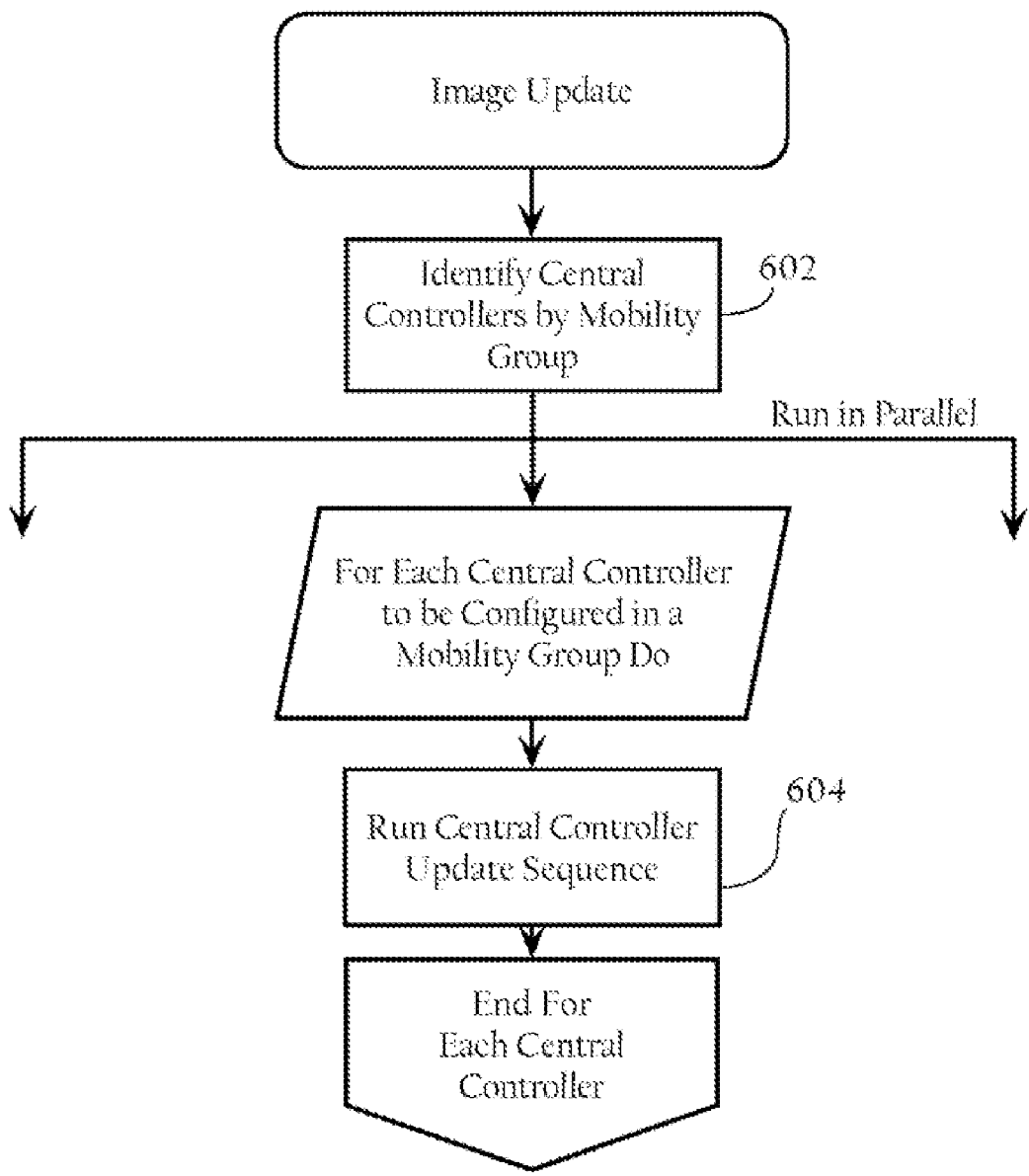
Fig._6

COORDINATED REBOOT MECHANISM REDUCING SERVICE DISRUPTION IN NETWORK ENVIRONMENTS

TECHNICAL FIELD

This disclosure relates generally to network management systems.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timelines and productivity of their communications and applications, and in doing so, require greater visibility, security, management, and performance from their network. A problem with wireless networks is that upgrades to wireless network elements may cause wireless service interruptions.

DESCRIPTION OF THE DRAWINGS

FIG. 1A illustrates example components in a wireless local are network (WLAN) system.

FIG. 1B illustrates an example hierarchical wireless network including a central controller.

FIG. 1C illustrates an example hardware system, which may be used to implement a central controller.

FIG. 4 illustrates an example network environment in which mobility groups may be updated.

FIG. 5 illustrates an example method implemented at a network management server.

FIG. 6 illustrates another example method implemented at a network management server.

DESCRIPTION OF EXAMPLE EMBODIMENTS

A. Overview

Figure 2:
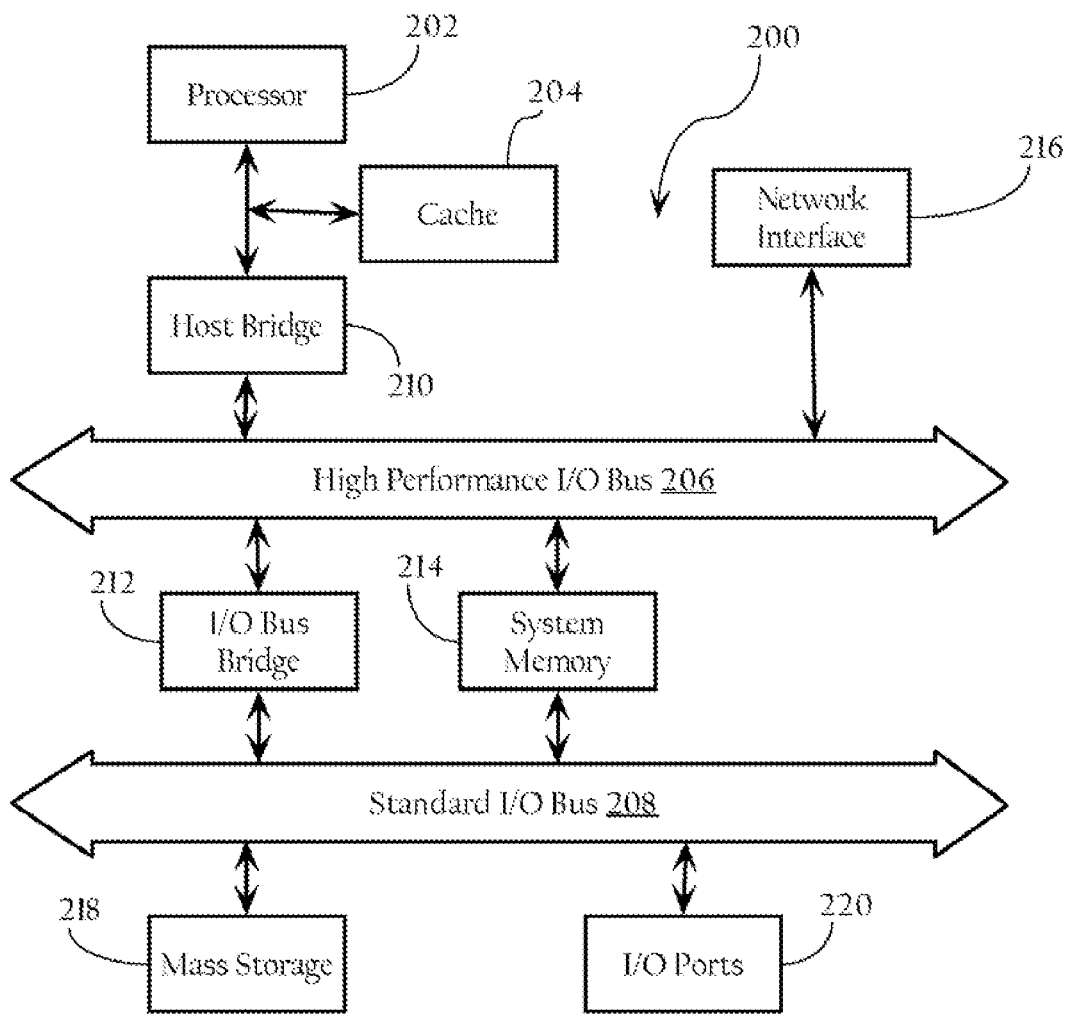
FIG. 2 illustrates an example hardware system, which may be used to implement a network management server.

Particular embodiments of the present invention facilitate configuration and/or image updates to one or more network elements while reducing service disruptions. In one particular implementation, when a network management server updates central controllers of a mobility group, the network management server downloads an updated image to each of the central controllers and may effectuate installation of the updated image upon rebooting. However, in one implementation, before rebooting, the wireless access points connected to the central controller first migrate from the central controller to an alternate central controller. After a sufficient number of wireless access points have successfully migrated, the central controller may then reboot to effectuate the updated image. In one implementation, the central controller may also perform configuration updates upon rebooting. The wireless access points may then migrate back to the central controller. Accordingly, wireless clients maintain their connectivity during the upgrade/reboot process, since wireless access points maintain their connectivity to the rest of the network infrastructure with which the wireless clients are communicating.

B. Example Wireless Network System Architecture

B.1. Network Topology

FIG. 1A illustrates example components in a wireless local area network (WLAN) system. In a specific embodiment of the present invention, the system includes a network management sever 20, a location server 22, routers 32a and 32b, central controllers 42a and 42b, local area networks (LANs) 30a and 30b, and wireless access points 50a, 50b, 50c, 50d, 50e, 50f, and 50g. LANs 30a and 30b may be implemented by switches (or arrays of switches) and/or other network devices, such as bridges.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allows for the transmission of messages between Network management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LANs 30a and 30b may be LANs, LAN segments implemented by Ethernet switches (not shown), or arrays of switches having multiple ports to which wireless access points 50 are connected. The wireless access points 50 are typically connected to switch ports via Ethernet links; however, other link layer connection protocols or communication means can be employed. FIG. 1A illustrated one possible network environment in which the invention may operate; however, other implementations are possible. For example, although Network management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points, or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to management one or more wireless switches and access points.

B.2. Central Controller

FIG. 1B illustrates an example hierarchical wireless network including a central controller 42 according to one implementation of the present invention. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with light-weight wireless access points and process wireless protocol and network management information. As FIG. 1B illustrates, a central controller 42 may be directly connected to one or more access points 50. Alternatively, a central controller 43 may be operably connected to one or more access points over a switched and/or routed network environment, as FIG. 1A illustrates.

FIG. 1C illustrates an example hardware system 100, which may be used to implement a central controller 42. As FIG. 1C shows, in one implementation, the central control elements each comprise a switch function or fabric 102 comprising a network interface 104a (e.g., an Ethernet adapter) for connection to network 52 and network interfaces 104b, 104c, and 104d for connection to wireless access points. This switch function or fabric is implemented to facilitate connection to the access elements. Central controller 42, in one implementation, further comprises a processor 106, a memory 108, one or more software modules stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller 42 includes a single network interface.

B.3. Network Management Server

FIG. 2 illustrates an example hardware system 200, which may be used to implement a network management server 20. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interference 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a board category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the network management server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.4. Wireless Access Point

Figure 3:
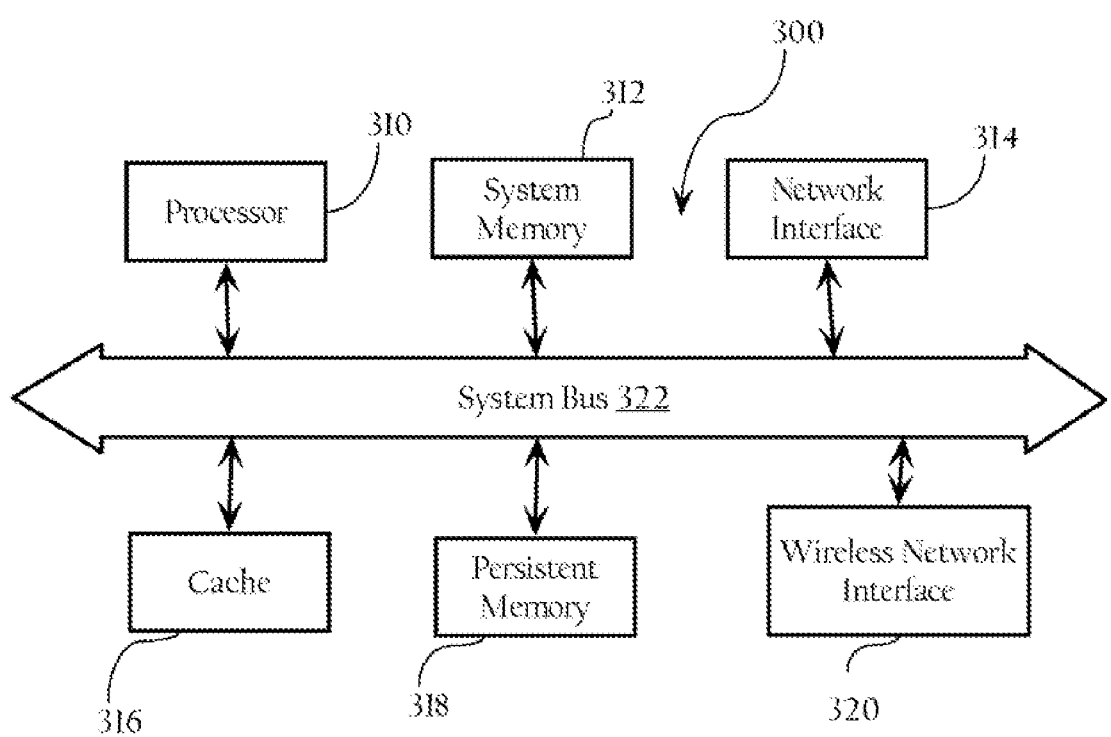
FIG. 3 illustrates an example hardware system, which may be used to implement a wireless access point.

FIG. 3 illustrates an example hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

C. Basic Wireless Network Environment for Updating Mobility Groups

FIG. 4 illustrates an example message flow in which a central controller may be updated without interrupting services provided by one or more access points associated with the central controller to be updated. FIG. 4 shows a network management sever 20, central controllers 42a and 42b, and a wireless access point 50. For ease of illustration, only two central controllers 42a and 42b and one wireless access point 50 are shown. Implementations of the present invention described herein may involve numerous central controllers and wireless access points. Generally, when network management server 20 updates a mobility group (which may include, for example, central controller 42*a*), network management server 20 may upload an updated image to the central controllers of the mobility group. Alternatively, the network management server 20 may provide a configuration data set, at least one attribute of which requires central controller 42*a* to reboot. In one implementation, central controller 42*a* may install, and then effectuate, the updated image (or new configuration) upon rebooting. However, before rebooting, wireless access points that may be connected to central controller 42*a*, such as wireless access point 50, first migrate from (primary) central controller 42*a* to an alternate (secondary) central controller 42*b*. Central controller 42*a* may then reboot to effectuate the updated image. In one implementation, central controller 42*a* may also perform configuration updates upon rebooting. Wireless access point 50 may then migrate back to central controller 42*a*. In one implementation, the network management server 20 may transmit messages to the central controllers to which the access points 50 migrated to cause them to transmit disable messages, causing the access points to migrate back to their primary central controller. Accordingly, wireless clients, associated with the wireless access point 50, do not loose connectivity during the upgrade/reboot process, since wireless access points associated with an alternate central controller. In one implementation, having connectivity means that wireless clients may continue to send traffic over the wireless network and the traffic will be forwarded by the new central controller rather than the old central controller.

FIG. 5 illustrates an example method implanted at a network management server 20. As FIG. 5 shows network management server 20 first transmits a disable message to central controller 42*a* (502) once network management server 20 determines that central controller 42*a* belongs to the mobility group to be updated. The disable message, in one implementation, instructs the central controller 42*a* to reboot or re-initialize. As discussed below, this disable message may cause the central controller to transmit a disable information message to the wireless access point 50 which causes the wireless access point 50 to migrate from the central controller 42*a* and to another central controller (e.g., central controller 42*b*) (see FIG. 4). Mobility groups are described in more detail below in connection with FIG. 6. Prior to, or concurrently with, transmission of the disable message, the network management server 20 has transmitted an image update and/or configuration update to the central controller 42*a*.

Network management server 20 then determines if it has received a response from central controller 42*a* (504) acknowledging that central controller 42*a* has received the disable message. If network management server 20 does not receive a response, network management server 20 transmits another disable message to central controller 42*a*. Network management sever 20 can continue to transmit disable messages for a configurable time threshold or waiting period. If a response is not received after this time threshold or waiting period, network management server 20 may log an error and, for example, notify a network administrator. Upon receiving the disable message, central controller 42*a* transmits a disable information message to the wireless access points 50 associated with central controller 42*a*. The disable information message transmitted to the wireless access points 50 indicate that the central controller 42*a* is going to be disabled. Upon receiving the disable message, each wireless access point migrates to an alternate or secondary central controller (such as central controller 42*b* of FIG. 4).

If network management sever 20 receives a response, network management server waits for a predefined or threshold time period (e.g., every 30 seconds) (506). In one implementation, the threshold period of time may be configured to allow the wireless access points sufficient time to migrate to a secondary central controller. In one implementation, each wireless access point may migrate to a predefined secondary central controller or may be triggered to discover an available central controller.

In one implementation, central controllers (e.g., 42*a*, 42*b*) are configured to transmit notification messages to network management server 20 in response to a new association of a wireless access point 50 that establishes a management connection. Network management server 20 can maintain the current associations between access points and central controllers in a data structure. In this manner, network management server 20 an determine to which central controller a given set of access points is associated, and by receiving notifications when the access points migrate from the central controller. In one implementation, the central controller may send notifications to the network management server 20 for each wireless access point that is associated or disassociated. In one implementation, the network management server 20 may periodically poll the central controller for a wireless access point list. Network management server 20 then determines if all wireless access points have migrated to an alternate central controller (e.g., central controller 42*b* ) (508). If not all wireless access points have migrated, network management server 20 determines if a number or percentage of wireless access points that have migrated has exceeded a predefined threshold (510). In other words, network management server 20 need not wait for all of the wireless access points to migrate. If the number of wireless a access points that have migrated has exceeded a predefined threshold, network management server 20 then transmits a reboot command to central controller 42*a* (512). In another implementation, the network management server 20 may simply wait anther threshold period of time.

Network management sever 20 then determines if the central controller 42*a* is back up and running (514). In one implementation, this can be accomplished by pinging the eternal controller 42*a* until it responds. In another implementation, the central controller 42*a* can be configured to transmit discovery messages upon initialization. In one implementation, discovery messages may be standard warm start or cold start traps sent to network management 20 server upon reboot. Network management sever 20 can monitor for these discovery messages. In another implementation, central controller 42*a* can be configured to transmit a message to network management server 20. If, after a time out period, the central controller 42*a* is not back up (514, 518), network management server 20 can log the error (520) and optionally transmit a notification to a network administrator.

FIG. 6 illustrates an example method implemented at a network management server 20. In one implementation, a user may request that the network management server 20 perform a software upgrade or configuration update followed by reboot on a mobility group. The upgrade or update may be schedule to run immediately or at a specific time. The user may specify the mobility group, and the new software image or the configuration changes and does the scheduling. As FIG. 6 shows, network management sever 20 first identifies central controllers (e.g., central controller 42*a*) by mobility group (620). In one implementation, a report on the upgrade may be generated and sent to a network administrator (e.g., via email). In one implementation, a mobility group defines the network elements that serve a radio frequency (RF) coverage area and may include one or more central controllers and one or more wireless access points. In one implementation, the central controllers of a given mobility group may have the same or similar configurations. In one implantation, network management server 20 may perform the following sequence in parallel of one or more mobility groups. For each central controller to be configured in a given mobility group, network management server 20 performs a configuration update sequence (604) and the process ends.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Software encoded in one or more computer-readable storage media comprising instructions executable by one or more processors and when executed operable to:
   identify one or more central controllers for update, wherein each central controller is operative to manage at least one wireless access point;
   select a first central controller from the one or more central controllers;
   transmit a first update message to the first central controller, the first update message comprising information corresponding to an update for the first controller;
   transmit a first disable message to the first central controller, the first disable message configured to cause the first central controller to transmit a second disable message to each of at least one first wireless access points managed by the first central controller, each second disable message instructing the corresponding first wireless access point to migrate to one of one or more second central controllers;
   determine whether the at least one first wireless access points have migrated to the one or more second central controllers; and
   conditionally transmit a reboot command message to the first central controller based on the determination of whether the at least one first wireless access points have migrated to the one or more second central controllers, the reboot command message configured to cause the first central controller to reboot in order to effectuate the update to the first central controller.

2. The software of claim 1 wherein the software is further operable to repeat the select, transmit update message, transmit disable message, and determine steps for each remaining central controller of the one or more central controllers.

3. The software of claim 1 wherein the software operable to conditionally transmit the reboot command message to the first central controller, is operable to transmit the reboot command message to the first central controller only when all of the at least one first wireless access points have migrated to the one or more second central controllers.

4. The software of claim 1 wherein the software operable to conditionally transmit the reboot command message to the first central controller, is operable to transmit the reboot command message to the first central controller only when a predefined percentage of the at least one first wireless access points have migrated to the one or more second central controllers.

5. The software of claim 1 wherein the software operable to conditionally transmit the reboot command message to the first central controller, is operable to transmit the reboot command message to the first central controller only when a predefined period of time has expired since the first disable message was transmitted to the first central controller.

6. The software of claim 1 wherein, to determine whether the at least one first wireless access points have migrated, the software is further operable to receive a notification message when a first wireless access point has migrated.

7. The software of claim 1 wherein, to determine whether the at least one first wireless access points have migrated, the software is further operable to maintain current associations between first wireless access points and the first central controller in a data structure.

8. A method comprising:
   identifying one or more central controllers for update, wherein each central controller is operative to manage at least one wireless access point;
   selecting a first central controller from the one or more central controllers;
   transmitting a first update message to the first central controller, the first update message comprising information corresponding to an update for the first controller;
   transmitting a first disable message to the first central controller, the first disable message configured to cause the first central controller to transmit a second disable message to each of at least one first wireless access points managed by the first central controller, each second disable message instructing the corresponding first wireless access point to migrate to one of one or more second central controllers;
   determining whether the at least one first wireless access points have migrated to the one or more second central controllers; and
   conditionally transmitting a reboot command message to the first central controller based on the determination of whether the at least one first wireless access points have migrated to the one or more second central controllers, the reboot command message configured to cause the first central controller to reboot in order to effectuate the update to the first central controller.

9. The method of claim 8 further comprising repeating the selecting, transmitting update message, transmitting disable message, and determining steps for each remaining central controller of the one or more central controllers.

10. The method of claim 8 wherein conditionally transmitting the reboot command message to the first central controller comprises conditionally transmitting the reboot command message to the first central controller only when all of the at least one first wireless access points have migrated to the one or more second central controllers.

11. The method of claim 8 wherein conditionally transmitting the reboot command message to the first central controller comprises conditionally transmitting the reboot command message to the first central controller only when a predefined percentage of the at least one first wireless access points have migrated to the one or more second central controllers.

12. The method of claim 8 wherein conditionally transmitting the reboot command message to the first central controller comprises conditionally transmitting the reboot command message to the first central controller only when a predefined period of time has expired since transmitting the first disable message to the first central controller.

13. The method of claim 8 further comprising receiving a notification message when a first wireless access point has migrated.

14. The method of claim 8 further comprising maintaining current associations between first wireless access points and the first central controller in a data structure.

15. A system comprising:
a wireless network infrastructure node operable to:
- identify one or more central controllers for update, wherein each central controller is operative to manage at least one wireless access point;
- select a first central controller from the one or more central controllers;
- transmit a first update message to the first central controller, the first update message comprising information corresponding to an update for the first controller;
- transmit a first disable message to the first central controller, the first disable message configured to cause the first central controller to transmit a second disable message to each of at least one first wireless access points managed by the first central controller, each second disable message instructing the corresponding first wireless access point to migrate to one of one or more second central controllers;
- determine whether the at least one first wireless access points have migrated to the one or more second central controllers; and
- conditionally transmit a reboot command message to the first central controller based on the determination of whether the at least one first wireless access points have migrated to the one or more second central controllers, the reboot command message configured to cause the first central controller to reboot in order to effectuate the update to the first central controller.

16. The system of claim 15 wherein the wireless network infrastructure node is further operable to repeat the select, transmit update message, transmit disable message, and determine steps for each remaining central controller of the one or more central controllers.

17. The system of claim 15 wherein the wireless network infrastructure node operable to conditionally transmit the reboot command message to the first central controller, is operable to transmit the reboot command message to the first central controller only when all of the at least one first wireless access points have migrated to the one or more second central controllers.

18. The system of claim 15 wherein the wireless network infrastructure node operable to conditionally transmit the reboot command message to the first central controller, is operable to transmit the reboot command message to the first central controller only when a predefined percentage have migrated to the one or more second central controllers.

19. The system of claim 15 wherein the wireless network infrastructure node operable to conditionally transmit the reboot command message to the first central controller, is operable to transmit the reboot command message to the first central controller only when a predefined period of time has expired since the first disable message was transmitted to the first central controller.

20. The system of claim 15 wherein, to determine whether the at least one first wireless access points have migrated, the wireless network infrastructure node is further operable to receive a transmit notification message each time a first wireless access point has migrated.

21. The system of claim 15 wherein, to determine whether the at least one first wireless access points have migrated, the wireless network infrastructure node is further operable to maintain current associations between access points and central controllers in a data structure.

* * * * *